United States Patent [19]

Setina

[11] 4,015,875
[45] Apr. 5, 1977

[54] VERTICAL SLIDING AUTOMOBILE PARTITION HAVING CURVED TRACK MOUNTED ON FRONT OF SHIELD PLATE

[76] Inventor: John R. Setina, 2926 Yelm Highway SE., Olympia, Wash. 98501

[22] Filed: Mar. 31, 1976

[21] Appl. No.: 672,404

[52] U.S. Cl. .............................. 296/24 R; 49/379
[51] Int. Cl.² ....................................... B62D 33/04
[58] Field of Search ............ 296/24 R, 85; 49/379, 49/376, 380; 280/749

[56] References Cited

UNITED STATES PATENTS

| 2,502,538 | 4/1950 | Stark | 296/85 |
|---|---|---|---|
| 2,632,668 | 3/1953 | Keller | 296/85 |
| 2,782,069 | 2/1957 | Storch | 296/85 X |
| 3,015,515 | 1/1962 | Halstead | 296/24 R |
| 3,441,309 | 4/1969 | Halstead | 296/24 R |
| 3,510,164 | 5/1970 | Setina | 296/24 R |
| 3,547,217 | 12/1970 | Garza | 296/24 R |
| 3,666,313 | 5/1972 | Halstead | 296/24 R |
| 3,667,801 | 6/1972 | Setina | 296/24 R |

FOREIGN PATENTS OR APPLICATIONS

| 129,716 | 10/1950 | Sweden | 296/24 |
|---|---|---|---|

Primary Examiner—Richard J. Johnson
Attorney, Agent, or Firm—Klarquist, Sparkman, Campbell, Leigh, Hall & Whinston

[57] ABSTRACT

An automobile partition apparatus is described including a curved vertical sliding partition window which, to provide greater rear seat legroom, is mounted on vertically curved tracks attached to the front surface of a shield plate separate from and located behind the front seat backrest. The shield plate and partition are attached to a roll bar to form an integral unit which is removably mounted on the body of the automobile to enable the unit to be removed without damage for use on another automobile. The window slides vertically between a closed position above the shield and an open position below the top of the shield where such window is located between the shield and the front seat backrest. The legs of the roll bar are curved to provide more head and shoulder room for rear seat passengers. A simple and compact window raising mechanism is mounted on the front of the shield which employs a flexible line having one end attached to the partition window. The line extends over pulleys mounted on the shield to a coil spring which moves horizontally to cause vertical movement of the partition window. A spring biased latch holds the sliding window in the open or closed positions and such latch is released manually or by a remotely operated solenoid in front of the partition apparatus.

18 Claims, 9 Drawing Figures

U.S. Patent   April 5, 1977   Sheet 2 of 3   4,015,875
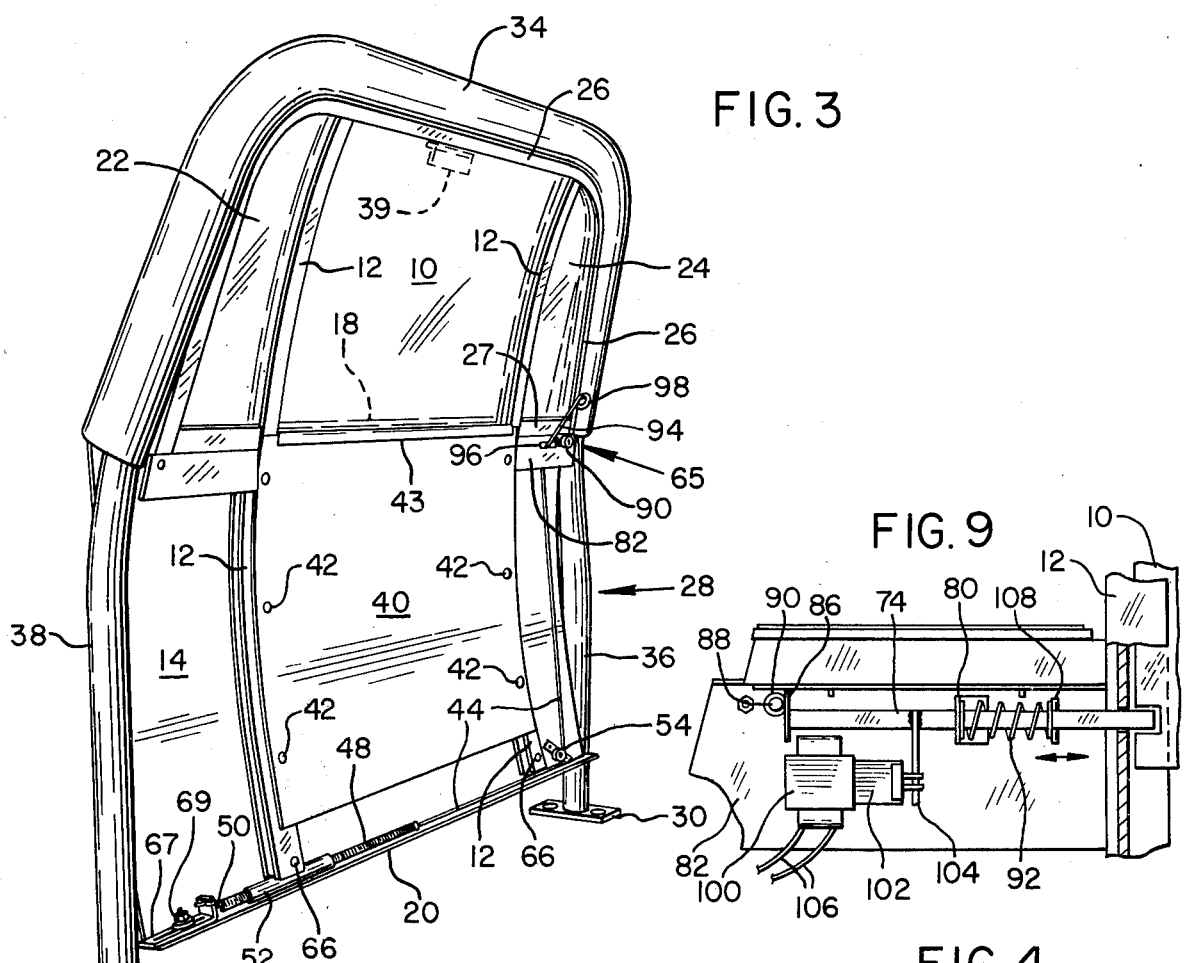

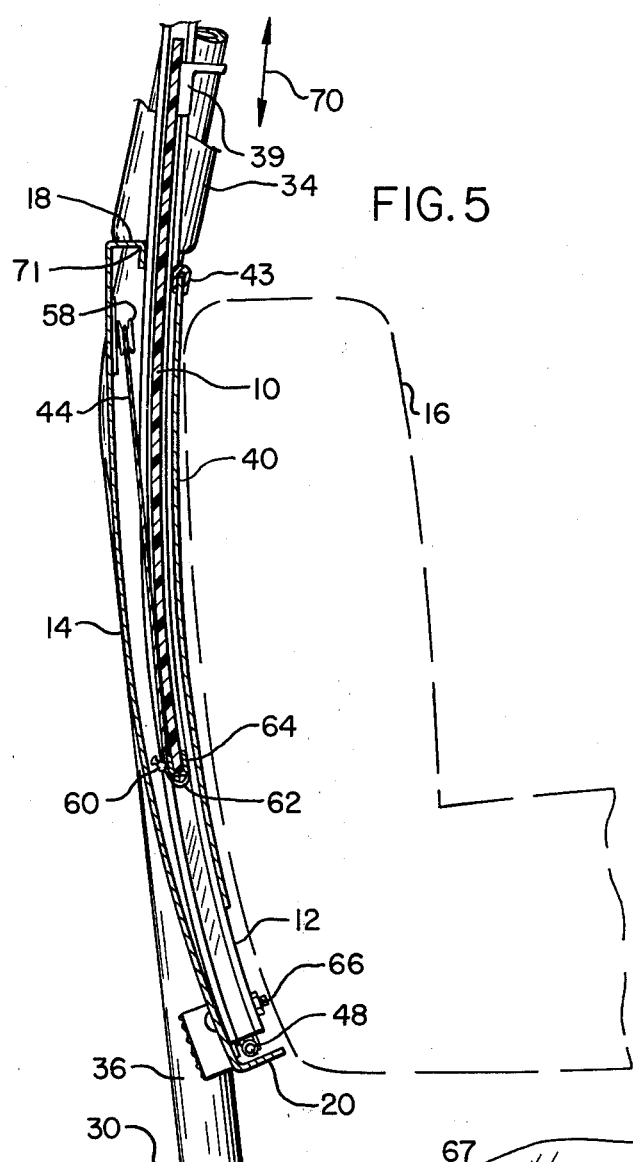
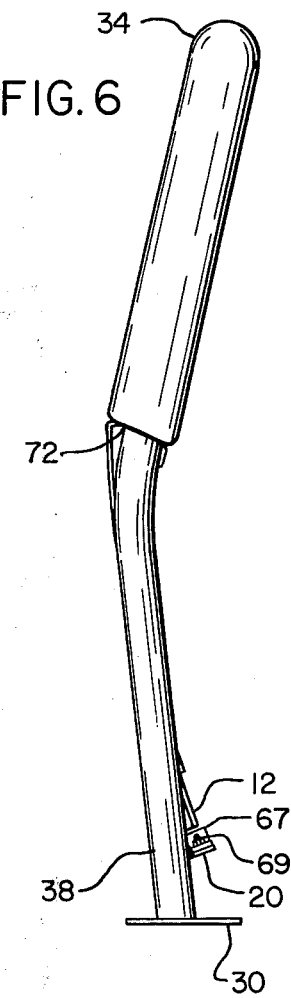
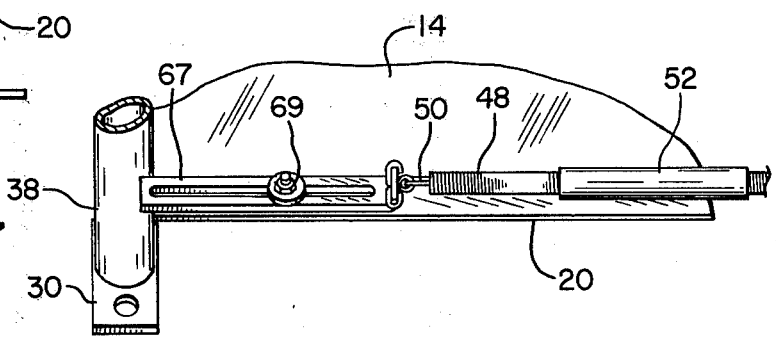
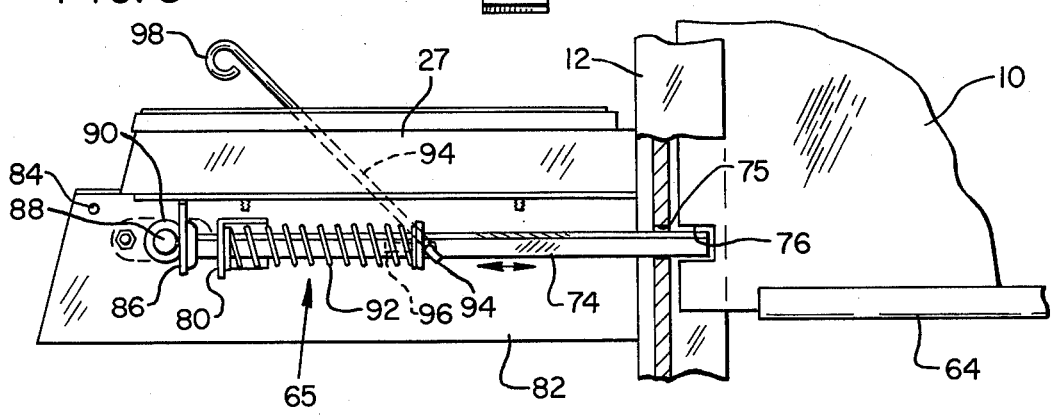

VERTICAL SLIDING AUTOMOBILE PARTITION HAVING CURVED TRACK MOUNTED ON FRONT OF SHIELD PLATE

BACKGROUND OF THE INVENTION

The present invention relates generally to automobile partition apparatus and in particular to such an apparatus employing a vertical sliding partition window mounted on curved tracks attached to the front of a shield plate located behind the front seat backrest and separate from such backrest.

The automobile partition apparatus of the present invention is especially useful for confining prisoners in the rear seat of police cars but could also be used in other ways, such as for confining animals or for use as partitions in taxicabs or chauffeured limousines.

The window track and the entire window raising mechanism are mounted on the front surface of the shield plate behind the front seat backrest. This reduces the width of the entire apparatus and, together with a vertically curved sliding window and track, increases leg room in the rear seat area. In addition, the automobile partition of the invention is a safer apparatus whose rear surface is free of projections which can injure the prisoner and is free of any mechanism which can be tampered with by the prisoner. As an added safety feature, a key operated lock is employed on the front of the partition to enable raising and lowering of the partition window, which can be operated by a police officer standing outside of the automobile. Greater head and shoulder room is provided in the rear seat compartment by making the roll bar on which the partition and shield are mounted with curved leg portions.

Previously, vertical sliding partitions have been used in automobiles, as shown in U.S. Pat. Nos. 3,015,515 and 3,441,306 of Halstead et al. However, in both of these partition apparatus, the partition window is mounted on tracks attached to the roll bar behind the shield extending across the front seat backrest. As a result, the backseat leg room is greatly reduced and the operating mechanism, including the track, is exposed to tampering by rear seat passengers. In addition, neither of these prior apparatus uses a vertically curved partition window mounted on similarly curved tracks.

Vertically curved tracks and sliding partition windows have previously been used for chauffeured limousines, as shown in U.S. Pat No. 2,632,668 of Keller, U.S. Pat. No. 2,782,069 of Storch, and U.S. Pat. No. 1,921,263 of Rivard. In each of these prior curved partitions, the track and partition apparatus, as well as its operating mechanism, is contained within a cavity provided in the front seat backrest or in a compartment permanently secured to such backrest. In addition, the track is mounted on the door posts of the automobile, rather than on the front surface of a shield plate, separate from the backrest, in the manner of the present invention. This has the disadvantage that in the prior apparatus, the partition apparatus is more expensive and cannot be removed from the automobile without damaging the automobile for transfer from one automobile to another.

It should be noted that some previous automobile partition apparatus have combined vertical movement and pivoting of the partition window, such as shown in U.S. Pat. No. 3,666,313 of Halstead et al. However, these apparatus have the disadvantage that the partition window projects laterally a considerable distance from the shield as it swings out from the shield during raising of the window. This is extremely dangerous because the partition can easily strike the rear seat passenger in the face. The apparatus of the present invention overcomes this problem by mounting the partition window on tracks attached to the front of the shield plate, which restricts movement of the window to sliding movement along the tracks, thereby preventing any pivotal movement of the window.

SUMMARY OF THE INVENTION

It is therefore one object of the present invention to provide an improved automobile partition of simple, economical construction and trouble free operation with a vertical sliding partition window which provides more leg room in the rear seat of the automobile.

Another object of the invention is to provide such a partition apparatus which is free of dangerous projections and which operates in a safe manner, to prevent injury to rear seat passengers.

A further object of the invention is to provide such a partition apparatus which is separate from the front seat of the automobile and can be removed for transfer to another automobile without damaging the automobile or the partition apparatus.

An additional object of the invention is to provide such an automobile partition apparatus in which the vertical sliding partition window is mounted on curved tracks, which, together with the operating mechanism for raising and lowering the window, are mounted on the front surface of a shield plate positioned behind the front seat backrest so that the operating mechanism and tracks cannot be tampered with by passengers in the rear seat.

Still another object of the invention is to provide such a partition apparatus in which the shield plate and the partition are attached to a roll bar to form an integral unit which can be easily installed and removed from automobiles.

A still further object of the present invention is to provide such a partition apparatus in which the roll bar is provided with curved leg portions to provide more head and shoulder room in the rear seat compartment for easier entry and exit.

A still additional object of the invention is to provide such a partition apparatus with a compact operating mechanism for automatically raising the partition window, including a flexible line attached at one end to the sliding window, extending over pulleys attached to the shield plate and connected at its other end to a coil spring which moves horizontally to provide vertical movement of the window.

BRIEF DESCRIPTION OF DRAWINGS

Other objects and advantages of the present invention will be apparent from the following detailed description of a preferred embodiment thereof and from the attached drawings, of which:

FIG. 3 is an oblique view of the front of the partition apparatus;

FIG. 4 is a plan view of the front of the partition apparatus with the cover plate removed and part of one track broken away for clarity;

FIG. 5 is a vertical section view taken along the line 5—5 of FIG. 4;

FIG. 6 is a side elevation view of the partition apparatus;

FIG. 7 is an enlarged view of a portion of the partition apparatus showing the spring operated mechanism for raising the sliding partition window;

FIG. 8 is an enlarged rear view of one embodiment of a lock means used for the sliding partition window; and FIG. 9 is an enlarged rear view of another embodiment of a lock means for the sliding partition window using a solenoid operated latch.

DESCRIPTION OF PREFERRED EMBODIMENT

Figure 1:
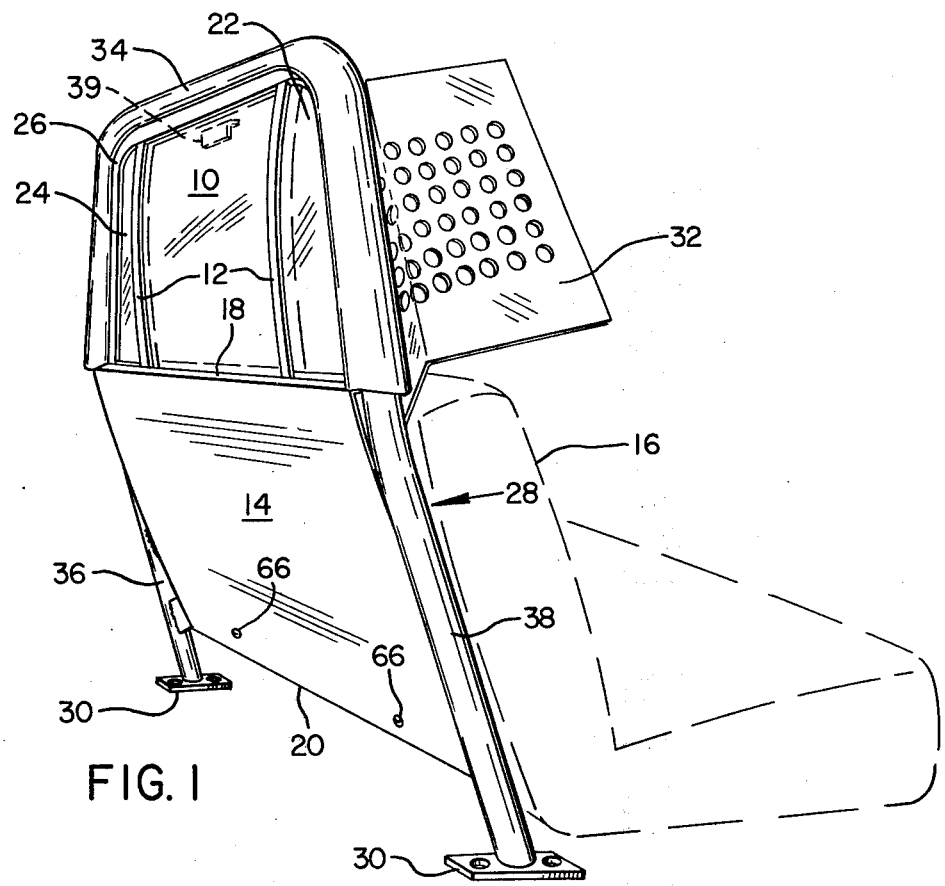
FIG. 1 is an oblique view of the partition apparatus of the present invention installed in an automobile.
Figure 2:
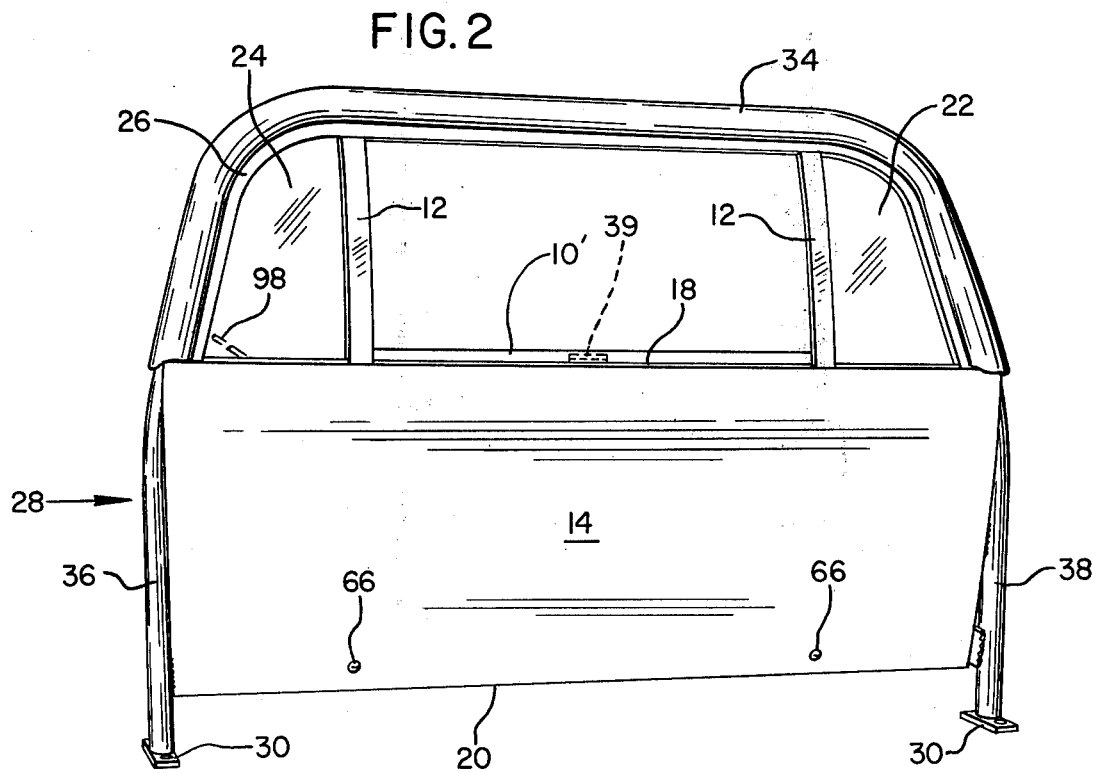
FIG. 2 is a plan view of the rear of such partition apparatus.

As shown in FIGS. 1 and 2, the automobile partition apparatus of the present invention includes a vertical sliding partition window 10 which is mounted between two vertically curved track members 12 attached to the front surface of a shield plate 14. The shield plate 14 extends across the width of the automobile behind the front seat backrest 16. The upper edge 18 of the shield plate terminates adjacent the top of the backrest 16 while the lower edge 20 of the shield terminates at a portion adjacent the floor of the automobile. As shown in FIG. 5, the sliding window 10 and the shield plate 14 are also curved vertically to provide increased leg room for rear seat passengers.

The partition apparatus also includes a pair of fixed partition windows 22 and 24 which are attached to a partition frame member 26 surrounding the outside and top portions of the fixed windows, as well as a pair of shorter frame members 27 extending along the bottom edges of such windows. The inside edges of the fixed windows 22 and 24 are contained within channels provided in the outside edge of track members 12. The track members 12 and the partition frame members 26 and 27 can be made of extruded aluminum. All of the windows 10, 22, and 24 are of a light transparent, substantially unbreakable plastic material, although it is also possible to make them of bullet proof safety glass or even of a heavy wire mesh which is sufficiently open to enable visual observation through such window. The shield plate 14 is preferably made of steel of sufficient thickness to be unbreakable and bullet proof.

The shield plate 14 and the partition apparatus are secured to a roll bar 28 in the form of a hollow steel tube which is removably attached to the floor of the automobile by brackets 30 bolted thereto. In addition, filler members 32 of apertured metal plate or expanded metal sheet may be used to secure the opposite sides of the curved top portion 34 of the roll bar to the door pillars of the automobile by screws. The top portion 34 of the roll bar is covered with foam rubber padding and the partition frame 26 is secured to such top portion by screws extending through the frame and such padding into the roll bar. The roll bar is supported on a pair of leg portions 36 and 38 between which the shield plate 14 extends with the opposite sides of such shield plate being welded to such leg portions.

The sliding partition window 10 slides vertically between an open position 10', shown in FIG. 2, and a closed position 10 shown in FIG. 1. A plastic handle 39 for manually lowering the window 10 to the open position, is glued to the front of such window adjacent its top edge. In the open position, the sliding window is lowered below the upper edge 18 of the guard plate 14 and stored between the front surface of such guard plate and the rear surface of the front seat backrest 16.

The window 10 is raised automatically to its closed position by an operating mechanism hereafter discussed. In the closed position, the sliding window is raised above the upper edge 18 of the shield plate so that it fills the space between such upper edge and the top portion 34 of the roll bar adjacent the roof of the automobile.

FIG. 3 shows a cover plate 40 attached over the front of the shield plate 14 by screws 42 to the channel members 12 to cover the automatic window raising mechanism mounted on the front surface of the shield plate 14 between such track member. A plastic trim strip 43 is provided on the top edge of the cover plate 40 to prevent injury.

As shown in FIG. 4, when the cover plate 40 is removed, the window operating mechanism is exposed. Such operating mechanism includes a flexible line 44 of nylon or steel cable having one end 46 attached to the free end of a coil spring 48. The other end 50 of the spring is fixedly attached to the shield plate 14. The spring 48 is provided with a pair of rubber sleeves 52 to cushion any vibration against the shield plate. The line 44 extends around 3 pulleys 54, 56, and 58 which are attached to the front surface of the shield plate. The other end of the flexible line 44 is secured by means of a clamp 60 to an eyelet 62, attached to the bottom of a metal channel member 64, extending along the bottom edge of the sliding window 10. The sliding window 10 may be locked in an open or closed position by a lock means 65 which may be operated by a person standing outside the automobile.

When the handle 98 is released, the spring 48 retracts with a horizontal movement to the left in FIG. 4 to pull the line 44 clockwise around the pulleys and cause vertical upward movement of the sliding window 10 into the closed position shown. On the other hand, vertical downward movement of the sliding window from the closed to the open position causes the line to be pulled counter clockwise around the pulleys stretching the spring 48 to the right into an energy storing condition. The coiled spring 48 is normally maintained in this stretched condition because the sliding window 10 is locked in its open position with the window lowered below the upper edge 18 of the shield plate. As shown in FIG. 7, the spring tension of spring 48 can be adjusted by fastening its fixed end 50 to a slotted bracket 67 which is secured to the shield plate by a bolt 69. The bolt 69 extends through the slot in bracket 67 so that such bracket can be adjusted longitudinally to different tension positions before the bolt is tightened down.

As shown in FIG. 2, the rear surface of the shield 14 is free of any dangerous projections and the operating mechanism of the window is not exposed to the rear seat to prevent tampering by rear seat passengers. Thus, only the heads of bolts 66, used to fasten the bottom of the track members 12 to the shield plate 14, extend through such shield plate to the rear seat area. The upper ends of the track members 12 are secured to the partition frame 26 by bolts extending downward through such frame into the track members. In addition, screws 68 attach the middle of the track members to a flange 71 at the top of the shield plate, as shown in FIG. 4.

The sliding partition window 10 is limited to vertical sliding movement in the direction of arrows 70, shown in FIG. 5, by the track members 12. As a result, there is no chance that the window can swing out and strike a rear seat passenger when he is seated. This, together with the fact that there are no prOjections on the rear surface of the shield plate, as shown in FIG. 2, makes the partition apparatus of the present invention extremely safe for passengers.

As shown in FIG. 6, the partition apparatus of the present invention is extremely narrow and does not extend beyond the width of the roll bar legs 38. Thus, the track members 12 and the shield plate 14 are of less width than the roll bar legs and even though curved, they do not extend behind or in front of such legs when viewed from the side. The roll bar legs 38 are bent at a point 72 adjacent the upper edge 18 of the shield plate where such legs join the upper portion 34 of the roll bar covered by the foam rubber material. Thus, the upper portion of the roll bar bends forward to provide more head and shoulder room for the rear seat passengers when they are entering and exiting from the automobile.

The lock means 65 is shown in FIG. 8 and includes a sliding latch bar 74 which extends through a guide hole 75 in the track member 12 and engages one of a pair of lower and upper lock notches 76 and 78 provided in the side edge of the sliding window 10. When the end of the latch bar engages notch 76, the window 10 is locked in its closed position and when such latch bar engages notch 78, such window is locked in its open position. The latch bar 74 slides through a guide bracket 80 fixed to a lock mounting plate 82 which is secured to the track member 12 and the partition frame member 26 by screws 84. A lock striker plate 86 is attached to the other end of the latch bar 74 and is supported for horizontal sliding movement with such latch bar. The striker plate engages a plunger member 88 of a key operated plunger lock 90 when such plunger lock is in a locked condition with the plunger extended, to prevent the latch bar 74 from being released from the lock notches. When the plunger lock 90 is unlocked by means of a key, the plunger 88 retracts so that the striker plate 86 passes over such plunger to enable the latch bar to be released from the lock notches 76 or 78.

The latch bar 74 is normally spring biased inward toward window 10 into a latched position by a coil spring 92 surrounding such bar, which has one end engaging the guide 80 and its other end engaging a thin rod 94 fastened through a hole in the bar. The rod 94 extends through a slot 96 in the mounting plate 82 to a handle portion 98 positioned on the front seat side of the partition apparatus adjacent the door. As a result, a policeman can unlock the plunger lock 90 with his key if it is locked and pull the handle 98 which releases the latch bar 74 from notch 78, while standing outside the automobile with a prisoner. This causes the sliding window 10 to be raised automatically by spring 48 from the open position to the closed position where the latch bar engages the notch 76 to latch the window in such closed position. Then the plunger lock is again locked with the key to prevent an outside accomplice from unlatching the sliding window and releasing the prisoner. Thus, there is less danger of a prisoner escaping during the procedure of raising the partition window and when the prisoner is contained in the rear seat of an automobile left unattended.

As shown in FIG. 9, another embodiment of the lock means for the sliding partition window includes a solenoid 100 for moving the latch bar 74 from its spring biased latched position within notches 76 or 78 to an unlatched position out of such notches, thereby enabling the window 10 to slide between its open and closed positions. The solenoid 100 is attached to the underside of mounting plate 82 and has its armature 102 connected to an operating rod 104 fixed to the latch bar 74 for movement of such bar to the left into the unlatched position when such solenoid is energized. This is achieved by closing a push-button switch (not shown) connected in series with the car battery and the lead wires 106 of the solenoid, such switch being located at a remote position in the front seat compartment such as under the dashboard. It should be noted that the lock means of FIG. 9 is similar to that of FIG. 8 so that the same numbers have been used to refer to similar parts. In addition to the changes previously described, the lock means of FIG. 9 includes a pin 108 in place of actuator rod 94, extending through the opening in latch bar 74 to engage the right end of latching spring 92 for spring biasing the latch bar in its latched position.

It will be obvious to those having ordinary skill in the art that many changes may be made in the details of the above described preferred embodiment of the present invention. For example, the roll bar could be eliminated and the shield plate bolted directly to the pillars of the automobile. Therefore, the scope of the present invention should only be determined by the following claims.

I Claim
1. Automobile partition apparatus comprising:
    shield means for preventing objects from passing from the rear seat to the front seat of the automobile, said shield means adapted to extend across the width of the automobile at a position behind and separate from the front seat backrest and to extend from an upper edge adjacent the top of the front seat backrest downward along said backrest to a lower edge;
    a substantially unbreakable, light transparent partition means for enabling visual observation over the shield means extending from the upper edge of said shield to the roof of the automobile, said partition means being separate from said backrest and including a vertical sliding partition window which slides along the front surface of the shield between an open position lowered below said upper edge of said guard plate and located between the shield and said backrest, and a closed position raised above said shield;
    vertically curved track means for supporting said partition window and for vertical sliding movement, and preventing pivotal movement of said partition window so that said partition window does not project behind said shield;
    means for attaching said track means to the front surface of said shield so that said track means extends along said shield and upward above the shield to form a portion of said partition means; and
    mounting means for attaching the shield means and the partition means to the body of the automobile as an integral unit which can be removed without damage.
2. Partition apparatus in accordance with claim 1 in which the partition window and the track are curved vertically so that the lower edge of said partition window is positioned ahead of its upper edge in said closed position.

3. Partition apparatus in accordance with claim 1 in which the mounting means is a roll bar.

4. Partition apparatus in accordance with claim 3 in which the roll bar has a pair of leg portions joined by a top portion adapted to support the roof of the automobile, said track means being spaced from said leg portions.

5. Partition apparatus in accordance with claim 4 in which the leg portions of the roll bar are curved vertically so that the top portion of the roll bar is bent forward and the track means and partition means do not extend beyond said leg portions.

6. Partition apparatus in accordance with claim 1 in which the track means includes two track members supporting the opposite ends of said sliding partition window.

7. Partition apparatus in accordance with claim 6 in which the partition means includes a pair of fixed partition windows mounted on said track members on opposite sides of said sliding partition window.

8. Partition apparatus in accordance with claim 1 which includes a window raising means mounted on the shield, including a flexible line for raising the sliding partition window from said lowered position to said raised position.

9. Partition apparatus in accordance with claim 8 in which one end of the flexible line is attached to a spring means for moving said line to raise the sliding partition window.

10. Partition apparatus in accordance with claim 9 in which the spring means is a coil spring and said line extends from said spring around guide means attached to the guard plate and extends to the lower edge of the sliding partition window where it is attached at its other end to said sliding window.

11. Partition apparatus in accordance with claim 10 in which the axis of the coil spring is displaced from the vertical direction and the guide means includes a plurality of pulleys for causing said other end of said line to move vertically in response to axial movement of said spring.

12. Partition apparatus in accordance with claim 11 in which one of the pulleys is attached to the shield adjacent its top edge between two track members of the track means supporting the opposite sides of said sliding window and the line extends vertically from said one pulley to said sliding window.

13. Partition apparatus in accordance with claim 1 which includes a key operated lock means for locking said sliding window in its open and closed positions which can be operated by a person outside of the automobile.

14. Partition apparatus in accordance with claim 13 in which the lock means includes a horizontal sliding latch member which engages one of a pair of spaced notches in the side edge of the sliding window in the open and closed positions of said window and a key operated plunger lock having a plunger member which prevents said latch member from being released from said notches when said plunger lock is locked.

15. Partition apparatus in accordance with claim 1 which includes solenoid operated lock means for locking the sliding window in its open and closed positions.

16. Partition apparatus in accordance with claim 15 in which the lock means includes a sliding latch member which is spring biased in a latched position and is moved to an unlatched position by the solenoid to enable the sliding window to slide between its open and closed positions.

17. Automobile partition apparatus comprising:
shield means for preventing objects from passing from the rear seat to the front seat of the automobile, said shield means adapted to extend across the width of the automobile at a position behind and separate from the front seat backrest and to extend from an upper edge adjacent the top of the front seat backrest downward along said backrest to a lower edge;
a substantially unbreakable, light transparent partition means for enabling visual observation over the shield means extending from the upper edge of said shleld to the roof of the automobile, said partition means being separate from said backrest and including a vertical sliding partition window which slides along the front surface of the shield between an open position lowered below said upper edge of said guard plate and located between the shield and said backrest, and a closed position raised above said shield;
track means for supporting said partition window and for vertical sliding movement, and preventing pivotal movement of said partition window so that said partition window does not project behind said shield;
means for attaching said track means to the front surface of said shield so that said track means extends along said shield and upward above the shield to form a portion of said partition means; and
solenoid operated lock means for locking the sliding window in its open and closed position.

18. Partition apparatus in accordance with claim 17 in which the lock means includes a sliding latch member which is spring biased in a latched position and is moved to an unlatched position by the solenoid to enable the sliding window to slide between its open and closed positions.

* * * * *